U S007773147B2

(12) United States Patent
Chuang

(10) Patent No.: US 7,773,147 B2
(45) Date of Patent: Aug. 10, 2010

(54) METHOD FOR PREDICTING QUANTITY OF TAKING PICTURES

(75) Inventor: Shih-Fang Chuang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 414 days.

(21) Appl. No.: 11/703,123

(22) Filed: Feb. 7, 2007

(65) Prior Publication Data
US 2008/0158390 A1 Jul. 3, 2008

(30) Foreign Application Priority Data
Dec. 27, 2006 (TW) .............................. 95149324 A

(51) Int. Cl.
*H04N 5/225* (2006.01)
(52) U.S. Cl. ........................ 348/372; 396/301; 396/303
(58) Field of Classification Search ................ 348/372, 348/333.02, 333.04, 333.13; 320/106, 124, 320/158, 159, 163, 164; 340/636.1, 636.11, 340/636.12, 636.13, 636.15; 396/301–304, 396/539
See application file for complete search history.

(56) References Cited
U.S. PATENT DOCUMENTS

| 6,339,264 | B1 * | 1/2002 | Wang ..................... 307/132 E |
| 7,050,105 | B2 * | 5/2006 | Akizuki et al. .............. 348/371 |
| 7,110,896 | B2 * | 9/2006 | Lamer et al. ................. 702/63 |
| 2003/0222867 | A1 * | 12/2003 | Bean et al. ................... 345/211 |
| 2004/0012712 | A1 * | 1/2004 | Kawakami ................... 348/372 |
| 2005/0062878 | A1 * | 3/2005 | Ogawa et al. ................ 348/372 |
| 2008/0055311 | A1 * | 3/2008 | Aleksic et al. .............. 345/428 |

* cited by examiner

*Primary Examiner*—Lin Ye
*Assistant Examiner*—Don Nguyen
(74) *Attorney, Agent, or Firm*—Rosenberg, Klein & Lee

(57) ABSTRACT

A method for predicting the quantity of pictures that can be taken is applied to a picture-taking function of a digital still camera. Firstly, a lookup table is individually built for different power using operations of a battery according to the operational modes of the picture-taking function. Next, the method looks up the corresponding lookup table according to an obtained battery voltage value of the digital still camera and the operational mode. Finally, a quantity of pictures that can be taken is obtained from the lookup table, and is displayed on a display unit of the digital still camera and is provided to the user. Thereby, the user can change the operational mode to reduce power consumption and take more pictures.

16 Claims, 4 Drawing Sheets live view mode

| voltage(V) | current consumption(mA) | power consumption(W) | battery discharging power(W) | quantity of pictures that can be taken |
|---|---|---|---|---|
| ⋮ | ⋮ | ⋮ | ⋮ | ⋮ |
| 3 | 480 | 1.44 | 16 | 11 |
| ⋮ | ⋮ | ⋮ | ⋮ | ⋮ |

11 — live view mode
12 — current consumption(mA)
13 — power consumption(W)
14 — battery discharging power(W)
15 — quantity of pictures that can be taken
10

| live view mode | voltage(V) | current consumption(mA) | power consumption(W) | battery discharging power(W) | quantity of pictures that can be taken |
|---|---|---|---|---|---|
| ..... | ..... | ..... | ..... | ..... | ..... |
| | 3 | 480 | 1.44 | 16 | 11 |
| ..... | ..... | ..... | ..... | ..... | ..... |

FIG. 3

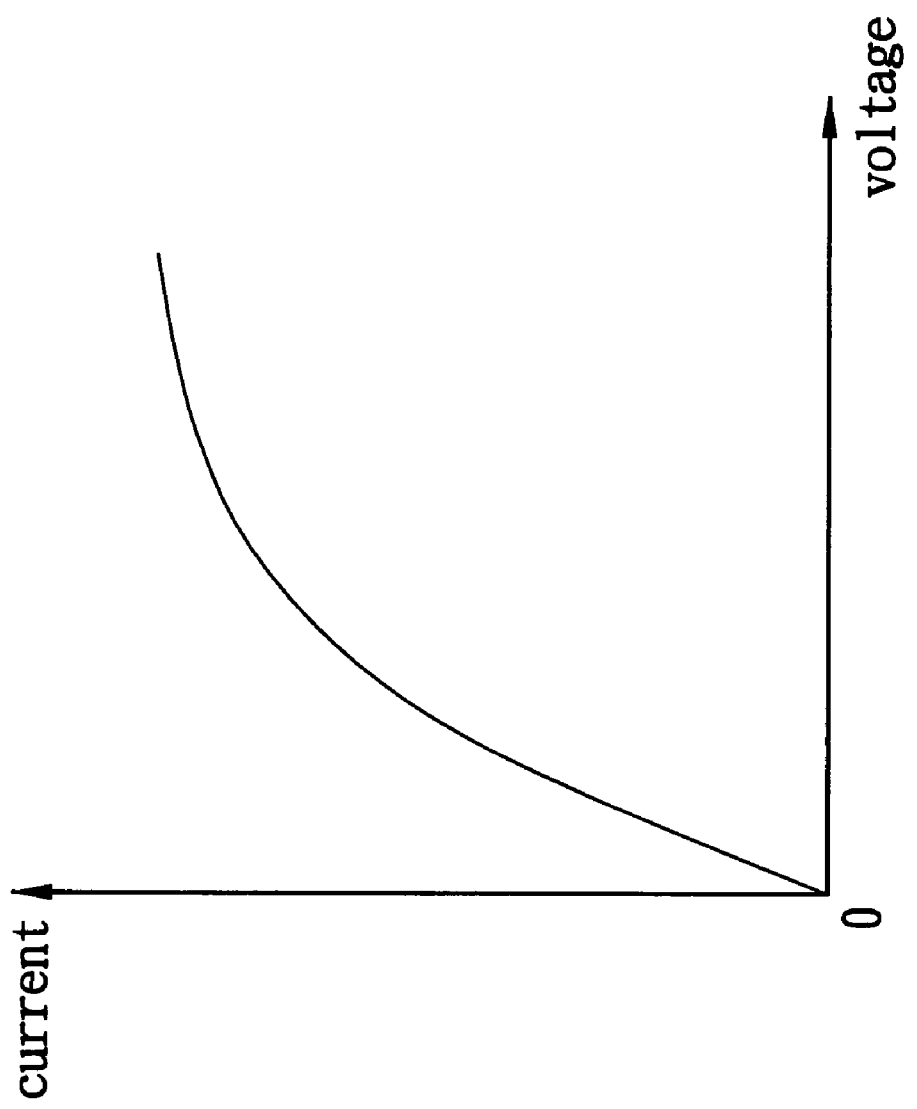

METHOD FOR PREDICTING QUANTITY OF TAKING PICTURES

BACKGROUND OF THE INVENTION

1. Field of the Invention

The present invention relates to a method for predicting the quantity of pictures that can be taken. In particular, this invention relates to a method that is applied to a digital still camera and utilizes the residual power of the battery to predict the quantity of pictures that can be taken.

2. Description of the Related Art

Recently, because the technology of digital still cameras has rapidly developed, digital still cameras have become popular and the capacity and speed of the memory cards used in the digital still cameras has also greatly improved. Moreover, the power supply, such as batteries, has also improved.

Reference is made to FIG. 1, which shows a schematic diagram of a status display in a digital still camera of the prior art. The digital still camera usually displays the capacity status of the memory card and the power status of the battery via a memory FIG. 11a and a battery FIG. 12a. In generally, the capacity of the memory card is displayed by a memory FIG. 11a, and the digital still camera 10a predicts and displays the available quantity of pictures that can be taken by calculating the residual capacity of the memory card according to the capacity or the number of pixels required for a single picture as set by the user. For displaying the residual power of the battery, the hardware of the digital still camera 10a includes a plurality of voltage detectors with different voltage levels to detect the power of the battery and display the residual power of the battery according to the detecting result from the voltage detectors. Furthermore, some digital still cameras 10a calculate the power required for different operational functions 13a, such as a picture-taking function or a picturing-viewing function, to predict and display the available time when the user switches to a specific operational function 13a.

Because lithium batteries are light and thin, and can be recharged, lithium batteries are popularly designed to match the digital still camera. However, in order to match the digital still camera, the dimensions of the lithium batteries for different digital still cameras are different. Also, lithium batteries cannot be exchanged making them inconvenient for users.

Furthermore, because the digital still camera respectively displays the related information by detecting the status of the memory card or the battery, the user cannot exactly know how many pictures can be taken by the user based upon the residual power of the battery. If the user is informed to replace the battery by the detecting method of the prior art, the suggestion is always issued when the residual power of the battery is too low. At this moment, the user cannot take any more pictures and may lose an opportunity to take an important picture.

SUMMARY OF THE INVENTION

One particular aspect of the present invention is to provide a method for predicting the quantity of pictures that can be taken. The present invention builds a lookup table for different operational modes of the digital still camera to store the required power for the different operational modes in the lookup table. Thereby, the present invention looks up the lookup table to predict the quantity of pictures that can be taken for the current voltage value under the operational mode, and achieves the goal of providing the available quantity of pictures that can be taken to the user. Therefore, the user can change the operational mode to reduce power consumption and take more pictures.

The method for predicting the quantity of pictures that can be taken is provided and is applied to a picture-taking function of a digital still camera. Firstly, a lookup table is built individually for each different power of a battery according to the operational modes of the picture-taking function. Next, the method looks up the corresponding lookup table according to an obtained battery voltage value of the digital still camera and the operational mode. Finally, a quantity of pictures that can be taken is obtained from the lookup table, and is displayed on a display unit of the digital still camera and is provided to the user.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows:

FIG. 3 is a schematic diagram of the lookup table for the live view mode of the preferred embodiment of the present invention; and FIG. 4 is a characteristic curve diagram of the lithium battery of the present invention.

DETAILED DESCRIPTION OF THE PREFERRED EMBODIMENTS

The method for predicting a quantity of pictures that can be taken is provided and is applied to a picture-taking function of a digital still camera. In the embodiment, a lithium battery is adopted and used as an example. Furthermore, different digital still cameras provide different operational modes for the picture-taking function. The basic operational modes include a normal mode, a flash mode, a live view mode and a zoom mode, and can be switched by the user. The normal mode means that the user merely presses the camera shutter to focus and take a picture. The flash mode means that the user opens the flash light to compensate for the brightness when the user takes a picture in the normal mode. The live view mode means that the user selects and watches the view from an LCD of the digital still camera. When the live view mode is closed, a view finder of the digital still camera is used for selecting a view. The zoom mode means that the user zooms in or zooms out upon objects and takes a picture by manually adjusting the focus distance.

Figure 1:
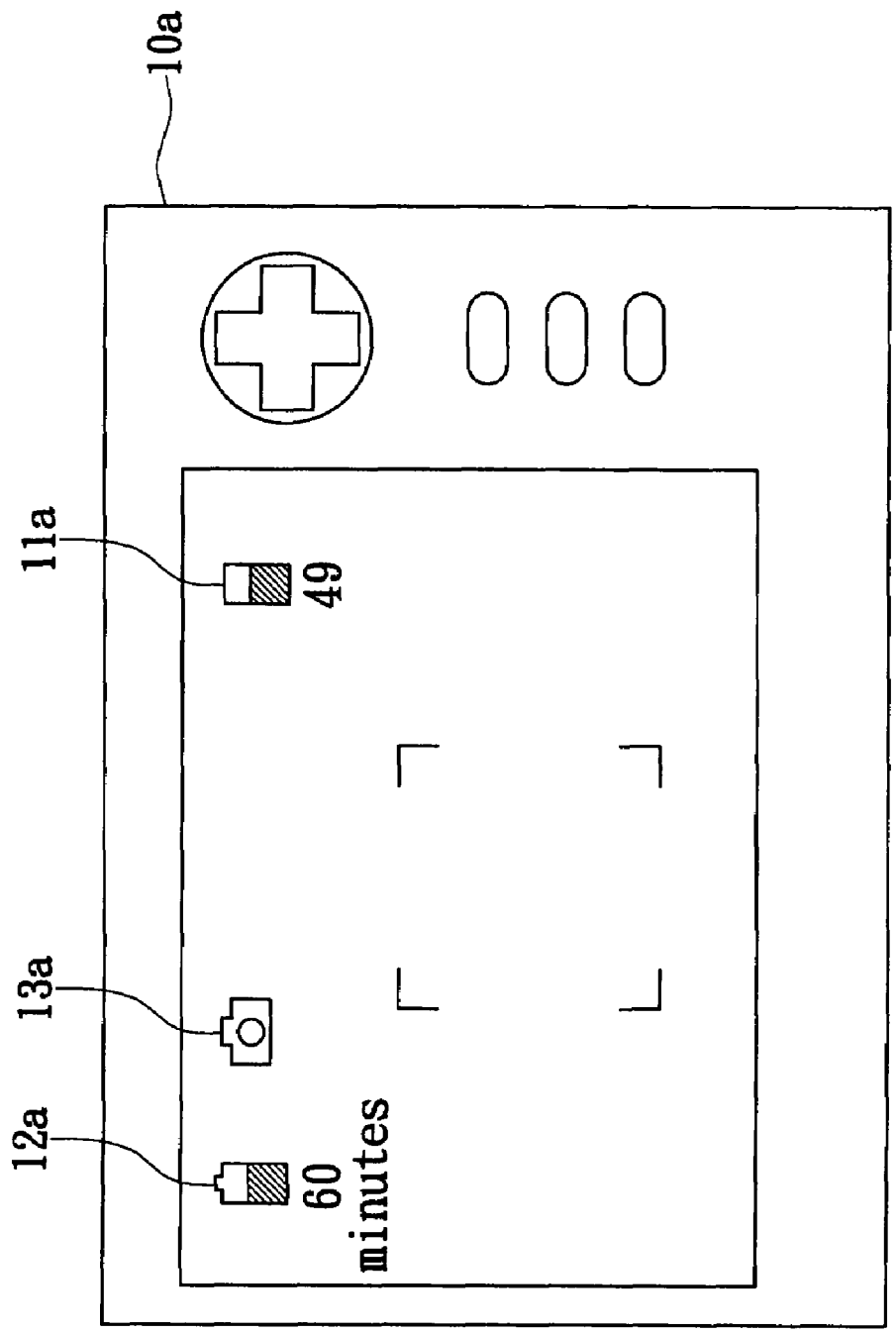
FIG. 1 is a schematic diagram of a status display in a digital still camera of the prior art.
Figure 2:
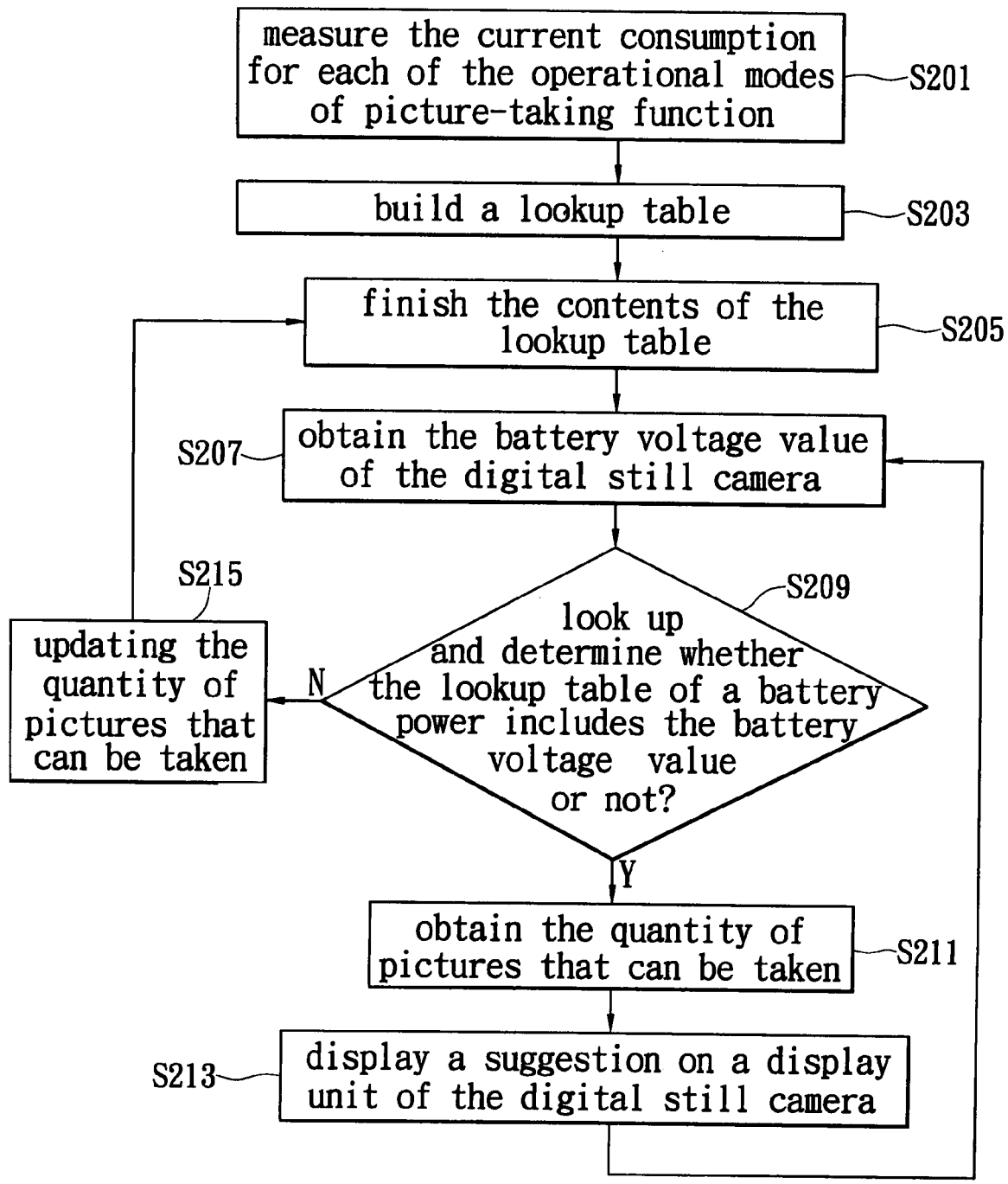
FIG. 2 is a flow chart of the method for predicting the quantity of pictures that can be taken of the preferred embodiment of the present invention.

Reference is made to FIG. 2, which shows a flow chart of the method for predicting the quantity of pictures that can be taken of the present invention. Firstly, a current probe is used for measuring the required current when the lithium battery of the digital still camera is operating under different operational modes of the picture-taking function (S201). Next, a lookup table is built for each of the operational modes of the picture-taking function (S203), and stores the measured power consumption. The power consumption is calculated and is inputted into the lookup table (S205). FIG. 3 shows a schematic diagram of the lookup table for the live view mode of the preferred embodiment of the present invention. The lookup table 10 includes a voltage column 11, a current consumption column 12, a power consumption column 13, a battery discharging power column 14, and a picture-taking quantity column 15. For the lithium battery, the voltage column stores the different voltage values with a fixed range, such as 1 volt. The current consumption column 12 records the measured current consumption (such as 480 mA) when the digital still camera is operating in the live view mode. The power consumption stored in the power consumption column 13 is calculated from the formula (power=voltage*current) and their values are obtained from the corresponding voltage column 11 and the current consumption column 12. For example, in FIG. 3, the value of the voltage column 11 is 3 volts, and the current consumption is 480 mA. Therefore, the power consumption in the power consumption column 13 is 1.44 W.

For the battery discharging power column 14, please refer to FIG. 4, which shows a characteristic curve diagram of the lithium battery of the present invention. From the diagram, the current to operating voltage relation for the lithium is obtained. By comparing the voltage value in the voltage column 11 with the characteristic curve diagram of the lithium battery, a current of the lithium is obtained. Next, these values are calculated to obtain the battery discharging power of the lithium battery, such as 16 W as shown in FIG. 3. The values in a picture-taking quantity column 15 are calculated from the values in the power consumption column 13 and the values in the battery discharging power column 14, such as 11 in FIG. 3.

After the lookup table is built (S205), an ADC (analog-to-digital converter) is used for detecting and converting the lithium battery of the digital still camera to obtain a current battery voltage value (S207). Next, the method looks up the lookup table according to the operational mode of the picture-taking function operated by the user to determine whether the obtained battery voltage value is recorded in the lookup table (S209). If the obtained battery voltage value is recorded in the lookup table, the quantity of pictures that can be taken is directly obtained (S211), and a suggestion, such as a text or a pattern, is generated on the display unit (such as the LCD) of the digital still camera (S213), to inform the user of the quantity of pictures that the user can take. After the step S213 is executed, the step of S207 is repeated to obtain the battery voltage value of the digital still camera for updating the quantity of the pictures that the user can take.

If the result of step S209 is negative, this means that the obtained battery voltage value is not recorded in the lookup table. A step of updating the lookup table for each of the operational modes is executed (S215). The battery voltage value that does not belong to a stored voltage value with a fixed range is recorded. The other columns in the lookup table are calculated and filled in.

The operational modes of the picture-taking function may be different in different digital still cameras. Therefore, the operational modes are not limited to the scope of the present invention. Means for predicting the available quantity of pictures that can be taken by looking up the battery voltage value of the digital still camera in a lookup table lie within the scope of the present invention.

The present invention improves the functions of the digital still camera by improving the software program and cooperating with the original hardware elements in the digital still camera. The cost of the digital still camera is not increased. Furthermore, the present invention informs the user of the quantity of pictures that the user can take on the display unit according to the available battery power of the digital still camera. Thereby, the user can determine when to replace the battery or change the operational mode to reduce power consumption so that the user can take more pictures according to the available quantity of pictures that can be taken.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A method for predicting a quantity of pictures that can be taken for a digital still camera using a proprietary battery, comprising:

building a lookup table, wherein the lookup table includes a power consumption column, a battery discharging power column, and a picture-taking quantity column for recording a relationship between a battery voltage value and a quantity of pictures to be taken, wherein the quantity of pictures to be taken stored in the picture-taking quantity column is determined by calculating a ratio between a power consumption value stored in the power consumption column and a power discharging value stored in the battery discharging power column;

obtaining the battery voltage value of the digital still camera and looking up the lookup table to determine whether the battery voltage value obtained is recorded in the lookup table; and if the battery voltage value obtained has been recorded in the lookup table obtaining the quantity of pictures to be taken from the picture-taking quantity column associated with the batter voltage value, or otherwise updating the lookup table according to the battery voltage value.

2. The method for predicting the quantity of pictures that can be taken as claimed in claim 1, wherein the lookup table comprises a voltage column, and a current consumption column.

3. The method for predicting the quantity of pictures that can be taken as claimed in claim 2, wherein the current of the current consumption column is obtained by measuring current via a current probe when the digital still camera is operating under an operational mode.

4. The method for predicting the quantity of pictures that can be taken as claimed in claim 2, wherein each power value of the battery discharging power column is generated by calculating corresponding voltage value of the voltage column according to a battery characteristic curve diagram.

5. The method for predicting the quantity of pictures that can be taken as claimed in claim 1, wherein the battery voltage value of the digital still camera is converted by an analog-to-digital converter.

6. The method for predicting the quantity of pictures that can be taken as claimed in claim 1, wherein the quantity of pictures that can be taken is displayed on a display unit of the digital still camera as a suggestion.

7. The method for predicting the quantity of pictures that can be taken as claimed in claim 6, wherein the suggestion is a text or a pattern.

8. A method for predicting the quantity of pictures that can be taken for a picture-taking function of a digital still camera using a proprietary battery, comprising:

individually building a lookup table having a power consumption column, a battery discharging power column, and a picture-taking quantity column according to operational modes of the picture-taking function, wherein the lookup table records a relationship between a battery voltage value and a quantity of pictures to be taken, wherein the quantity of pictures to be taken stored in the picture-taking quantity column is determined by calculating a ratio between a power consumption value stored in the power consumption column and a power discharging value stored in the battery discharging power column;

obtaining the battery voltage value of the digital still camera and looking up the corresponding lookup table according to the operational mode of the picture-taking function to determine whether the battery voltage value obtained is recorded in the lookup table; and if the battery voltage value obtained has been recorded in the lookup table obtaining the quantity of pictures to be taken from the picture-taking quantity column associated with the battery voltage value, or otherwise updating the lookup table according to the battery voltage value obtained.

9. The method for predicting the quantity of pictures that can be taken as claimed in claim 8, wherein the operational mode of the picture-taking function is a normal mode, a flash mode, a live view mode, or a zoom mode.

10. The method for predicting the quantity of pictures that can be taken as claimed in claim 8, wherein the lookup table comprises a voltage column, and a current consumption column.

11. The method for predicting the quantity of pictures that can be taken as claimed in claim 10, wherein the current of the current consumption column is obtained by measuring current via a current probe when the digital still camera is operating under the operational mode.

12. The method for predicting the quantity of pictures that can be taken as claimed in claim 10, wherein each power value of the battery discharging power column is generated by calculating corresponding voltage value of the voltage column according to a battery characteristic curve diagram.

13. The method for predicting the quantity of pictures that can be taken as claimed in claim 8, wherein the battery voltage value of the digital still camera is converted by an analog-to-digital converter.

14. The method for predicting the quantity of pictures that can be taken as claimed in claim 8, wherein the quantity of pictures that can be taken is displayed on a display unit of the digital still camera as a suggestion.

15. The method for predicting the quantity of pictures that can be taken as claimed in claim 14, wherein the suggestion is a text or a pattern.

16. The method for predicting the quantity of pictures that can be taken as claimed in claim 14, wherein the battery voltage value of the digital still camera is repeatedly obtained to continuously obtain the quantity of pictures that can be taken after the suggestion is displayed.

* * * * *